United States Patent

[11] 3,581,969

[72] Inventor Albert G. Bodine
7877 Woodley Ave., Van Nuys, Calif. 91406
[21] Appl. No. 804,798
[22] Filed Mar. 6, 1969
Division of Ser. No. 537,163, Mar. 24, 1966, Pat. No. 3,439,409.
[45] Patented June 1, 1971

[54] APPARATUS FOR ACCOMPLISHING SONIC FUSION WELDING AND THE LIKE INVOLVING VARIABLE IMPEDANCE LOAD FACTORS
6 Claims, 14 Drawing Figs.
[52] U.S. Cl...................................................... 228/1,
29/470.3, 156/73, 228/2
[51] Int. Cl...................................................... B23k 27/00
[50] Field of Search........................................... 228/1, 1 X;
29/470.3; 156/73

[56] References Cited
UNITED STATES PATENTS
3,184,841 5/1965 Jones et al..................... 228/1X
3,002,871 10/1961 Tramm et al. ................. 228/2X

Primary Examiner—John F. Campbell
Assistant Examiner—Robert J. Craig
Attorney—Sokolski & Wohlgemuth

ABSTRACT: Parts to be welded together are supported with the surfaces to be joined in contact with one another. A resonator member is coupled to at least one of the parts and an orbiting mass oscillator is connected to said resonator member. The orbiting mass oscillator is driven at a frequency such as to cause resonant elastic vibration of the associated resonator member slightly below the peak resonant frequency. The sonic energy is transmitted to the surfaces to be joined, generating heat at such surfaces thereby fusing the parts together.

APPARATUS FOR ACCOMPLISHING SONIC FUSION WELDING AND THE LIKE INVOLVING VARIABLE IMPEDANCE LOAD FACTORS

This application is a division of my application, Ser. No. 537,163 filed Mar. 24, 1966, now U.S. Pat. No. 3439,409.

This invention is directed to apparatus for application of sonic vibratory welding for making certain types of weld joints, and to a novel acoustic circuit capable of carrying out such process effectively.

A welding process called friction welding is now known, wherein two parts to be welded are rotated together under pressure until the heat generated thereby causes a softening of the metal. The rotation is then stopped and the parts forged together, generally with application of additional pressure. The process presents the problem of stopping the rotation precisely before the softened metal is disrupted, and the process is inapplicable for various reasons in many situations.

Sonic, nonfusion welding, particularly in the ultrasonic range, has been applied to two thin workpieces in contact with one another, for example, by transmitting lateral vibrations to one of the pieces along a coupling stem from a magnetostriction transducer, or the equivalent. The laterally vibratory coupling stem engages against an outside surface of the workpiece to which it is coupled, and vibrates laterally in the plane of this outside surface. Apparently, through frictional vibrations of the coupling stem against this outside surface of the workpiece, a vibratory shear stress is established in the piece, and with the simultaneous application of pressure, a sort of crystal interlock with the other piece can be produced. The temperature is below the fusion temperature, and this is therefore not a case of fusion welding, but essentially a cold-weld process.

The present invention is concerned with a situation wherein at least one of the parts being welded is of an elongated nature, like a piece of pipe, and wherein torsional elastic vibrations are engendered within the part being welded. These elastic vibrations cause the part being welded to experience elastic hysteresis effects, which cause internal heating within the part. This internal heating within the part is a very significant factor in this invention because the elongated part is subjected to an actual pattern of elastic vibrations. This internal hysteresis heating of the part is so significant because it tends to avoid the extraction of heat by the part from the localized region where the sonic friction weld is taking place at the end of the part. The elongated parts otherwise would tend to extract heat from the weld region, and thereby interfere with the weld action. The elongated shape of the part involves a considerable amount of surface area along the sidewalls, which aggravates the dissipation of heat from the weld region. The above-mentioned benefits accrue from the invention disclosed herein, where an elongated member such as a pipe or the like is welded to another member, which other member can also be an elongated member.

The sonic welding of the present invention is of a novel vibratory, friction-fusion type, involving transmission of sonic vibratory energy through or into a workpiece to be welded, in a manner to cause vibration of the workpiece relative to another workpiece which is to be welded to the first and which is being held against the latter. Use of the word "sonic" should not be understood as implying limitation to the subjective limits of audibility, but includes frequencies both above and below the audible range. It refers instead to vibrations in the nature of sound waves, often characteristically, but not necessarily, within the audible spectrum. The metal of the two workpieces is heated and softened by the ensuing vibratory friction, and welds by fusion. As the material fuses, and the weld then sets up, certain substantial changes take place in acoustic impedance at the weld, and a principal feature of the present invention is that these changes in impedance are acoustically accommodated to advantage in the practice of the invention, as will appear hereinafter.

It is a characteristic of the practice of the present invention that there be employed a resonant acoustic circuit, including an oscillator or vibration generator, and a tuned vibration transmitter, or resonator, acoustically coupled and mechanically connected to the vibrated workpiece. The vibrated workpiece, as well as the mating workpiece to which the former is to be welded, are part of the resonant acoustic circuit. The tuned vibration transmitter may be a circuit element in addition to the vibrated workpiece, or may comprise a part of, or be the entirety of, the vibrated workpiece. In most cases, and in the preferred practice, the transmitter or resonator part of the circuit is predominantly of a distributed constant character, with elements of mass and elasticity distributed throughout it, so as to vibrate at resonance in a resonant standing wave pattern. The circuit may often contain lumped masses or compliances, however, which may substantially modify the standing wave pattern, or give it a complex character. It is also possible to practice the broad invention with a discrete acoustic circuit involving substantially only lumped constants, e.g., a vibration generator, and a resonator and load combination comprised simply of lumped compliance and mass elements.

The present invention is reliant for success upon certain basic principles of acoustics of considerable obscurity. An acoustic system such as is utilized in the practice of the invention amounts to a discrete resonant acoustic "circuit," inclusive of a vibration generator, a resonant, elastic, acoustic energy transmitter, or elastic resonator, and a load, which is the "work." The generator and transmitter or resonator components constitute an acoustic "tool"; the "work" constitutes the varying impedance load which receives sonic energy from the acoustic tool; and the whole comprises a discrete acoustic circuit. These circuit elements and their interrelationships, in turn, often involve considerations of impedance, frequency, wavelength, resonance, phase angle, power factor, and the like, and such parameters must be ordered so that the "work" acts as a working part of this acoustic circuit, and the result desired follows from energization and operation of the circuit. The ability of the invention to carry out assigned tasks usefully and effectively depends of course upon the operational effectiveness of the circuit, and therefore upon how well the circuit has been contrived to carry out the work process in hand.

The fundamental system of the present invention depends upon use of a certain orbital-mass type of vibration generator in the acoustic resonant circuit mentioned above. It has been mentioned earlier that the site of the weld undergoes certain changes in impedance during the process, and these have certain effects such as on resonance vibration frequency and power factor. The orbital-mass vibration generator uniquely accommodates these changes in the course of the welding process, as will be stressed hereinafter.

The orbital-mass generator may take any of various mechanical forms, of which the simplest is a mass eccentrically mounted on a shaft turning in a bearing, so that the mass generates a centrifugal force which is reactively opposed by the bearing. The bearing is on a support frame, in response to the centrifugal force so generated and applied, exerts a periodic inertial force on whatever may support it or be coupled thereto. Some improved forms of orbital-mass generator or oscillator are disclosed in my U.S. Pat. Nos. 2,960,314 and 3,217,551. In these patents are disclosed orbital-mass oscillators comprising a cylindrical mass rolling around the inside of a bearing race ring, and a ring-shaped mass spinning on a bearing pin. In some cases, the generator may be driven by an electrical motor such as an induction motor, or, where increased speed responsiveness to load is desired, by a series motor. In others, as in the case of rollers or rings, the drive may be by an air or other fluid jet directed against the roller or ring. Thus, in many cases, a "slip"-type drive is used. In all cases, there is an orbiting mass comprised of a weight driven so as to travel around a closed circular path, which path is determined by a circular bearing forcibly constraining the weight to travel in this curved path. The bearing then experiences a powerful rotating reaction force caused by the weight moving along it circular path, which force is periodic in nature because each point spaced around the bearing is periodically subjected to this force. Together with its support frame, the bearing is thus a reactive coupling output device.

Also, in all cases, the bearing has a support frame, as aforesaid, adapted for making the actual coupling to the system to be vibrated. The mass of the bearing and support frame may be very considerable in relation to that of the orbiting mass. The momentum imparted to this considerable mass must be equal to that of the small orbital mass, and since the velocity of the small orbital mass is quite high, the motion of this considerable mass is thus relatively low. I therefore have the advantage of a large mass moving periodically with great force or momentum, but through small displacement distance at relatively low velocity. This represents a condition of relatively high impedance (defined hereinafter) in the support frame, i.e. in the generator output coupling element, such as is uniquely suited to the circuit requirements of the present invention.

Such a vibration generator may be arranged and utilized so as to deliver from the generator support frame, or coupling means, a continuously rotating force vector. In the more usual case, however, the desired or useful output is an alternating force doing work in reverse directions along a given direction line, and such a force, and other very important advantages to be mentioned, are obtained by combining with the orbital-mass generator a suitable resonator system, such as a relatively massive elastic resonator bar. The bar is, for example, attached at one end to the support frame of the generator, so that it has impressed thereon periodic output impulses from the generator. The bar may then, for example, have such a length in relation to the frequency or periodicity of the generator (circuits per second of the orbital mass) as to vibrate longitudinally in a half wavelength or fundamental resonant standing wave pattern. The end of the bar attached to the generator support frame, together with the latter, then vibrate longitudinally of the bar; the opposite end of the bar, which may be the work-performing end, vibrates longitudinally in opposite phase to the first mentioned end; and a midregion of the bar has minimized vibration amplitude. The latter region is the location of a node or pseudonode of the standing wave, while the moving ends are at antinodes of the wave. The bar will be seen to alternately elastically elongate and contract and by this motion may do work. This standing wave performance is a resonant phenomenon, and in this case, assuming a uniform bar, and neglecting lumped constant effects of the mass at the two ends of the bar, occurs when $F=s/2h$, where $F$ is the fundamental resonant frequency, $s$ is equal to the velocity of sound in the bar, and $h$ is the length of the bar. At resonance, the mass and compliance reactances of the vibratory system are equal and cancel one another, the impedance to vibration of the masses of the system is thereby reduced to that owing to friction (actual work done), and vibration amplitude in the bar is resonantly magnified by a large factor. In effect, the blocking impedance of the masses along the direction line of the bar has been very greatly reduced, generator output force consumed by this impedance of the masses along the direction line of the bar has been very greatly reduced, generator output force consumed by this impedance along this direction line is correspondingly diminished, and large vibratory motion along the direction line of the bar is attained.

In this resonant performance, the large necessary vibratory masses of the system are "tuned out" and consume none of the output force from the orbital-mass generator. They are moved by elastic restoration forces exerted by the deformed compliances, which are in turn elastically deformed, of course, in decelerating the masses. Thus the massive elastic system vibrates with no consumption of force save for that lost in friction and in doing useful work.

A further considerable advantage in the system is that the masses will then vibrate at substantial amplitude (exhibit large vibrational displacement), and become a powerful acoustic flywheel, storing considerable energy. The masses become an advantage. The system exhibits resonant magnification of motion. This gives a system which can build up to high vibratory power level; and the energy storage flywheel effect also gives the ability to "ride over" irregularities presented by the workload.

From the foregoing it will be appreciated that an orbiting mass, such as one confined to traveling around a circular path, delivers its reaction against this confinement as a reactive centrifugal force which inherently rotates so as to be a force oriented successively in all directions in a plane. On the other hand, as has been shown, the resonating bar, or equivalent, can, for example, be a longitudinally elastically vibratory bar. Such resonant motion is thus typically vibration back and forth along a line or path. Since such resonance, however, eliminates the blocking effect of the masses only this line or path, the vibratory amplitude will be of substantial magnitude only along this same line or path, even though the oscillator is delivering force in an infinite number of directions radiating around the focal center of the mass orbit. The above-described natural blocking effect of the masses thus prevents the vibration from being substantial, except in the path direction or directions along which the phenomenon of resonance has eliminated the blocking mass effect as described. The performance of the orbital-mass oscillator, in combination with the resonance exerted thereby, and which I term orbit resonance, can thus polarize the resulting vibration from the orbiting mass, and gives stability of vibratory motion along this line of orientation. The vibration stroke can thus be confined along a predetermined path.

Another very important property of the present system is a unique frequency stability. An orbiting mass vibration generator by itself can tend to change its frequency from time to time. However, in the orbit-resonance system, this orbiting mass is acoustically coupled to a resonant vibratory system, with dimensional proportions adjusted so that the orbiting mass is very conscious, so to speak, of the impedance of the resonant system. Within the resonant frequency range, and especially in the preferred operating region on the low side of the resonance peak, where resonant magnification exhibits sharply increasing amplitude in response to increasing frequency, the orbiting-mass oscillator automatically tends to "lock in" and hold to a stable frequency condition. The explanation is as follows: A slight increase in frequency, resulting from any cause, produces an increase in vibration velocity and amplitude. This results from the reactive part of the impedance having been thereby diminished. The phase angle of the orbital mass is thus improved, so more work can be done if more drive effort is supplied. Thus, more drive torque is required of the orbiting-mass oscillator, and, in turn, more drive effort from its drive source or prime mover. Thus, the vibratory system, operating near resonance, feeds back a demand for additional drive effort. Using a drive source whose drive effort on the oscillator remains constant, or whose output is insufficient to develop the increased drive torque demanded at the increased frequency, or using as a source a prime mover which is inversely speed responsive to load (e.g., an induction motor, or for greater responsiveness, a series motor), the system responds by actually reducing the drive speed of the oscillator in the face of this increase in demand for drive torque. Thus the initially assumed slight increase in frequency is corrected. The system similarly responds to a slight decrease in frequency by moving further from resonance, and through a process which will now be evident, produces increased speed at the orbiting-mass vibration generator such as to correct the assumed slight decrease in frequency. The system thus automatically holds a determined frequency. Bearing in mind the impedance equation $F=VZ$, where $F$ is drive force exerted by the oscillator on the vibratory system, and $V$ is the velocity of vibration, an increase in frequency toward the resonance peak must be accompanied by increase in $V$ and in the total energy of the system, and the force factor $F$ must be sufficient that this will be done notwithstanding a decrease in the reactive component of the impedance $Z$ as resonance is approached. The force $F$ must be increased to reach or sustain the new conditions, and thus the above-mentioned demand for increased torque takes place. This increase in torque is not supplied. Therefore, the frequency reduces following, or in response to, the increase which first took place. The system thus has inherent frequency stability.

The combined system of an orbital-mass vibration generator and resonator has a unique performance which is exhibited in the form of a greater effectiveness and particularly greater persistence in sustained sonic action as the work process goes through successive phases involving changes of working conditions. The orbiting mass generator in this combination is able to sustain its development of power for the load as the sonic energy absorbing environment changes with the variations in sonic energy absorption by the load. It does this by automatically changing its phase angle, and therefore its power factor, with these changes in the resistive impedance of the load.

This can be explained as follows: Consider the orbital-mass oscillator used in this invention, say of the type involving a roller mass traveling in a circular path around the inside of a cylindrical bearing, and assume this bearing to be fixed to a free end of an elastic bar, the axis of the bearing being perpendicular to the length axis of the bar. Assume further than the roller mass is driven around the bearing at a frequency of $s/2h$ c.p.s., where $s$ is the velocity of sound in the bar and $h$ is the length of the bar, so that the bar is driven by the cyclic output force exerted by the bearing to undergo half wavelength standing wave vibration. The bar then alternately elastically elongates and contracts, at the cyclic frequency of the roller mass. The longitudinal velocity of the driven end of the bar, and also the force exerted by the bearing on the bar, can then be plotted as sinusoidal waves. With no net work done on or through the bar, the force wave then lags the velocity wave by 90°. The phase angle of the roller in its race is such that at this time it moves longitudinally of the bar in step with the oscillator end of the bar. This is a condition of 90° phase angle, a power factor of zero, and zero net work done. Assume now that the vibrating bar is subjected to substantial friction. The velocity wave loses amplitude, and the roller mass automatically undergoes an angular shift in position within its race so as to bring the sinusoidal force wave more into phase with the velocity wave. The phase angle is thus reduced, and power factor increased the necessary amount for the generator to develop and supply the energy consumption required by the friction now encountered. Correspondingly, if the friction were large to start, and subsequently diminished, the phase angle would be small to start, and would subsequently go towards or to substantially 90° with progressive elimination of friction.

Also, if the "load" on the orbital-mass oscillator-resonator combination should vary in mass reactance, or elastic compliance reactance, during operation, the frequency and phase angle of the oscillator will shift to accommodate these changes. A change in reactance of a vibratory system can be accomplished, for example, if during vibratory operation, a part having mass is welded to a vibrating part. Such a change in reactance results in a change in impedance, phase angle, and resonance frequency. If the prime mover is one which has "slip," or is speed responsive to torque, there is a resulting automatic feedback of torque to the prime mover which drives the orbiting-mass oscillator such as to reestablish stable operation at a new resonant frequency, and with adjusted phase angle and power factor which automatically accommodate the added reactance and any remaining energy-consuming load. Any changes in magnitude of either or both the friction or energy-consuming part of the load and the reactive part of the load are thus automatically accommodated by the invention so that the oscillator sustains its development and transmission of power into the load throughout all such changes.

To accomplish these performances the resonant system must be sufficiently large relative to the resistive impedance so as to exhibit resonant magnification. Moreover, the orbital-mass generator must have sufficient output force and impedance so as to accomplish such resonant magnification, even with the resistive load; and this generator output must also be large enough to cause the stabilizing torque load on the generator drive. However, the generator output and input should not be so high as to cause a power flow which overrides the resonant feedback phenomenon above described. This resonance phenomenon could be undesirably buried if it is simply caught between a very powerful generator and a large resistive load.

The invention is further disclosed hereinafter in a number of practical applications, all of which involve the broad principles of the invention, but each of which involves specific unique features of invention. These will be disclosed and stressed in connection with the descriptions of illustrative apparatus for carrying out the several practical applications referred to just above.

Before proceeding with the detailed descriptions of the invention, however, there will be presented a discussion of certain principles of sonics necessary to an understanding of the invention, some of which are generally familiar to those skilled in the art, but a number of which are not.

SONIC DISCUSSION

Certain acoustic phenomena disclosed in the foregoing and hereinafter, are, generally speaking, outside the experience of those skilled in the acoustics art. The aid in a full understanding of these phenomena by those skilled in the acoustics art, and by others, the following general discussion, including definition of terms, is deemed to be of importance.

By the expression "sonic vibration" I mean elastic vibrations, i.e. cyclic elastic deformations, such as longitudinal, lateral, gyratory, torsional, etc., produced in an elastic structure, or which travel through a medium with a characteristic velocity of propagation, and which are often at resonance in the structure, or are involved with traveling or standing waves. If these vibrations travel longitudinally, or create a longitudinal wave pattern in a medium or structure having uniformly distributed constants of elasticity and mass, this is the simplest form of sound wave transmission. Regardless of the vibratory frequency of such wound wave transmission, the same mathematical formulas apply, and the science is called sonics irrespective of audible limits. In addition to purely distributed constant systems, there can be elastically vibratory (sonic) systems wherein the essential feature of mass appears wholly or in part, as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutual influencing effects like equivalent factors in alternating-current electrical system. In fact, in both distributed and lumped constant systems, mass is mathematically equivalent to inductances (a coil); elastic compliance is mathematically equivalent to capacitance (a condenser); and friction or other pure energy dissipation is mathematically equivalent to resistance (a resistor).

Because of these equivalents, my elastic vibratory systems with their mass and stiffness and energy consumption, and their sonic energy transmission properties, once they have been conceived of as acoustic circuits, can be viewed as equivalent electrical circuits, where the functions can be expressed, considered, changed and quantitatively analyzed by using well-proven electrical formulas.

It is important to recognize that the transmission of sonic energy into the interface or work area between two parts to be moved against one another requires the above-mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking one these special properties skin to the parameters of inductance and capacitance in alternating-current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaption impedance is also equal to media density times the speed of propagation of the elastic vibration.

Impedance is important to the accomplishment of desired ends, such as where there is an interface. A sonic vibration transmitted across an interface between two media or two structures can experience some reflection, depending upon differences of impedance. This can be availed of, if desired, to cause large relative motion at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems.

An additional important feature of these sonic circuits is the fact that they can be made very active, so as to handle substantial power, by providing a high "Q" factor. Here this factor Q is the ratio of energy stored to energy dissipated per cycle. In other words, with a high Q-factor, the sonic system can store a high level of sonic energy, to which a constant input and output of energy is respectively added and subtracted. Circuitwise, this Q-factor is numerically the ratio of inductive reactance to resistance. Moreover, a high Q-system is dynamically active, giving considerably cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where $M$ is vibratory mass, $C$ is elastic compliance (the reciprocal of stiffness, or of modulus of elasticity) and $f$ is the vibration frequency.

Resistance is the "real" part $R$ of the impedance, and represents energy dissipation, as by friction.

Reactance is the "imaginary" part of the impedance, and is the difference of mass reactance and compliance reactance.

Mass reactance is the positive imaginary part of the impedance, given by $2\pi fM$. It is analogous to electrical inductive reactance, just as mass is analogous to inductance.

Elastic compliance reactance is the negative imaginary part of impedance, given by $1/2\pi fC$. Elastic compliance reactance is analogous to electrical capacitive reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance along, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force-generating means can thus deliver its full impulse to the "work," which is the resistive component of the impedance.

Sometimes it is especially beneficial to couple the sonic oscillator or vibration generator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work-delivering region.

For very high-impedance systems having high Q at high frequency, I sometimes prefer that the resonant elastic system be a bar of solid material such as steel. For lower frequency or lower impedance, especially where large amplitude vibration is desired, I use a fluid resonator. One highly desirable species of my invention employs, as the source of sonic power, a sonic resonant system comprising an elastic resonator member in combination with an orbiting mass oscillator or vibration generator, as above mentioned. This combination has many unique and desirable features. For example, this orbiting mass oscillator has the ability to adjust its input power and phase to the resonant system so as to accommodate changes in the workload, including changes in either or both the reactive impedance and the resistive impedance. This is a very desirable feature in that the oscillator "hangs on" to the load even as the load changes.

It is important to note that this unique advantage of the orbiting mass vibration generator accrues from the use thereof in the acoustic resonant circuit, so as to comprise, with the work or load, a complete acoustic system or circuit. In other words, the orbiting mass vibration generator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

The invention will be further understood from the following detailed description of a generic representation and a number of specific illustrative embodiments thereof, reference for this purpose being had to the accompanying drawings, in which.

Figures 1, 2:
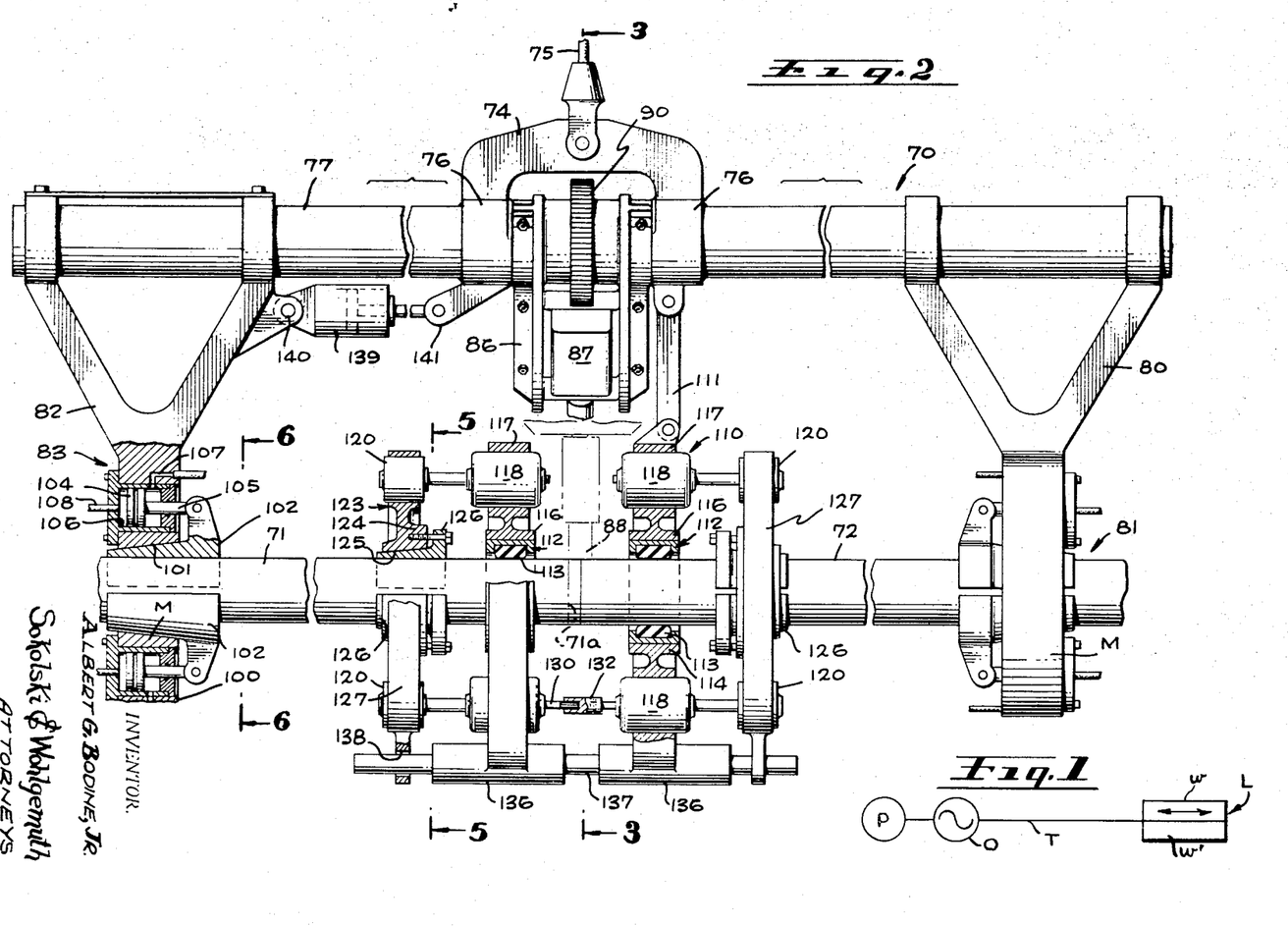
FIG. 1 is a diagrammatic view of an acoustic circuit illustrative of the invention.
FIG. 2 is a side elevational view, with some parts shown in vertical medial section, of a sonic machine for fusion welding of the abutting ends of two sections of pipe.

Reference is first directed to FIG. 1, illustrative schematically of the basic acoustic system of the invention, and of all the subsequently described species thereof. An oscillator or elastic vibration generator, of the orbital-mass type, as described hereinbefore, is designated at O, and is slip driven by a driver or prime mover P. A tuned elastic vibration transmitter or elastic resonator T is coupled to this generator and to the work or load, designated generally at L. In the preferred case, here diagrammed, the member T is coupled between the generator and the load, though broadly it is only necessary that these elements all be acoustically intercoupled and the generator and resonator thus could be attached to the load at a common coupling point. The load L is to be understood to have an impedance which varies materially during the performance of the work, i.e. with consumption of sonic energy, thereby modifying in an advantageous manner the performance of the generator O. It consists in this instance of two elements to be welded, w and w', which are in frictional, vibrational, sliding contact, as represented, and one of which is on or positively attached to, or forms a part of, the vibration transmitter T, so as to be directly vibrated by the vibrations transmitted to it and into it by the latter. Thus, in one typical and common case, for example, the vibrations are transmitted elastically along the transmitter, and thence into and along or within the workpiece connected to the transmitter. The entire system, composed of generator O, vibration transmitter. The entire system, composed of generator O, vibration transmitter or resonator T, and load L, constitutes a discrete resonant acoustic circuit. Thus, the generator O is driven by the prime mover P at a frequency at which the circuit is in the range of resonance. To obtain important frequency stabilization benefits, the prime mover drives the generator at a frequency in the resonance range, but somewhat under the frequency for peak resonance. Further, the prime mover for the generator is matched in the acoustic circuit in such a manner that it will just supply the drive torque necessary to establish and maintain operation in a resonant range but below the peak of resonance. As mentioned hereinabove, a slip-drive type of prime mover is capable of doing this, e.g., a fluid motor, with just enough torque to hold operation up to the resonance range, but insufficient to obtain the peak of resonance. Also, an electric motor inversely speed responsive to load, such as an induction motor, or a series-wound motor, can carry out this function. The components O, T and L of this discrete circuit all enter intrinsically into the resonance performance, and present a combination of mass and elastic compliance reactances which cancel out internally of the acoustic circuit at its resonant operating frequency.

The vibration transmitter T may vibrate longitudinally, laterally, torsionally, or gyrationally (which is a special case of two lateral vibrations in quadrature). The oscillator is understood to be connected properly to the transmitter to produce any desired one of such modes of vibration. The vibration transmitter is positively connected to, or forms an integral part of, one of the workpieces, so that said workpiece vibrates directly and in full accord with the portion of the transmitter to which it is connected.

The load L has a frictional resistance factor R, owing to the workpieces w and w' vibrating against and relatively to one another, and in the operation of the system, this factor R may hold constant for a time, and then as temperature rises by reason of the friction, and the metal of the parts softens, the frictional factor diminishes, and may finally drop substantially to zero. In the meantime the parts w and w' fuse and become forged or welded to one another, so that the reactance of the part w' is added to the system. Thus the impedance of the load changes, by diminishing friction R, often accompanied by increasing reactance. The diminishing friction, and also the increasing reactance, lead to a reduced power factor, a higher Q and a modified resonance frequency (in some forms lowered, by addition predominantly of mass reactance). To these changes, the slip-driven orbiting mass oscillator instantly responds, continuing to deliver power at resonance, preferably just under the peak of resonance, and following any changes in resonance frequency, always with the proper phase angle to sustain the load throughout the changing conditions of the process.

Following fusion of the parts, vibration is of course terminated, and the parts are cooled, or allowed to cool.

In the work process represented in FIG. 1, the vibration transmitter T is typically a longitudinally elastically vibratory bar, vibrating at resonance, in an effectively half wavelength standing wave pattern (actually, somewhat shorter owing to lumped constant effects at the end of the bar). As the weld is made, the mass of the added workpiece is added onto the end of the bar and vibrates therewith. Typically, this adds inductance or mass reactance, while frictional resistance is greatly reduced, and the resonant frequency of the system accordingly lowers. The slip-driven orbital-mass generator follows this lowering resonance frequency, and changes its phase angle and power factor, as mentioned hereinabove. In this process, the changes referred to are facilitated by an acoustic lever effect, by which the impedance of the load is matched or adjusted to the impedance of the generator by the intervening vibration transmitter bar. Thus, the ratio of cyclic force to vibration amplitude at the generator is matched to a higher ratio of cyclic force to vibration amplitude at the location of the weld, particularly after the weld has set up somewhat, and if the part welded on is of large mass. In such case the amplitude of vibration in the elastic vibration bar is of course greater at the generator than at the weld. In any case in which this effect is not needed, the elastic vibration transmitter bar need not intervene between the generator and the weld. Instead, by a mere reversal of parts 5 the generator may be directly connected to one of the workpieces to be welded, and the elastic bar then simply coupled to the generator. In such case, the elastic bar still plays an essential role, since it is a necessary element to the acoustic resonant circuit, and acts to afford the tuning to resonance and automatic resonant frequency accommodation essential to the invention.

In this case, as mentioned, the progress of the work is accompanied by a decrease in resonant frequency, which is followed by the orbital-mass generator. There are also cases in which changing character of the load during the work process results in an increase in resonant frequency, and as pointed out hereinafter, such a change will also be followed by the orbital-mass vibration generator.

Reference is directed to FIGS. 2—8, inclusive, illustrative of an application of the invention to the welding of pipe joints, applicable with particular efficacy and advantage to aluminum pipe. In this practice of the invention, the mode of sonic vibration may be a torsional mode, a gyrating mode, or a lateral mode. The illustrative machine disclosed herein shows particularly a torsional mode. In the carrying out of the invention, a novel machine has been contrived which is characterized by both compactness and easy portability, and thus is adapted for use out in the field where pipelines are being laid.

A principal advantage of the sonic pipe-welding process of the invention is that it can accomplish fusion welding without causing residual lockup stresses in the joint such as occurs with normal electric arc or other conventional welding processes. Also, with the sonic process, it is possible to readily obtain a lead-proof joint, with a very close approach to 100 percent of the strength of the original pipe. The process is applicable with alloys which are difficult to weld by electric- or acetylene-type welding. Moreover, the use of sonic fusion welding eliminates fire hazards accompanying electric or acetylene welding of long pipe joints.

The sonic fusion pipe-welding machine of the invention is designated by reference numeral 70, and is shown applied to the welding together of the ends of two pipes 71 and 72, of which the latter may be the end pipe section of a previously laid pipeline, and the former may be a new pipe length to be added.

The machine is shown to include a hanger yoke 74, suspended by a cable 75 from any suitable means of support not shown. The hanger yoke 74 has two yoke arms in the form of spaced sleeves or collars 76 which receive a horizontal suspension pipe 77 projecting in opposite directions therefrom, and the pipe 77 is secured to the hanger 74 as by welding.

On one side of hanger 74, the pipe 77 has welded thereto a depending suspension means 80 for a clamp means 81 for clamping tightly to the pipe 72. On the opposite side of hanger 74, a somewhat similar suspension means 82 is provided, but is arranged for sliding movement along the pipe 77, and this suspension means 82 carries a clamp means 83 for the pipe 71, the clamp means 81 and 83 being similar to one another.

Figures 3, 4, 5, 6:
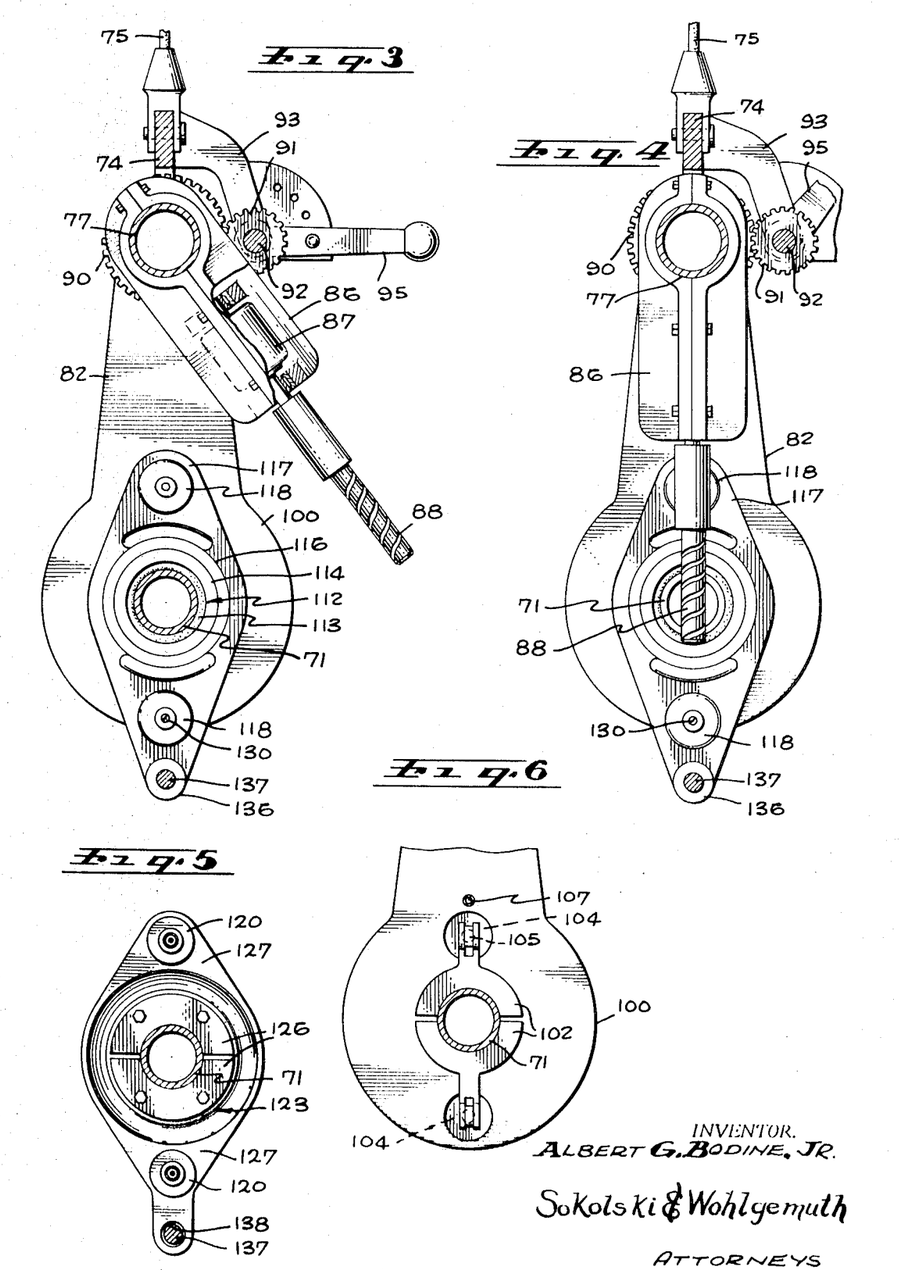
FIG. 3 is a transverse section taken as indicated by line 3-3 of FIG. 9.
FIG. 4 is a view similar to FIG. 2, but showing the parts in a different position.
FIG. 5 is a section taken on line 4-4 of FIG. 2.
FIG. 6 is a section taken on line 6-6 of FIG. 9.
Figures 7, 8, 9, 10, 11:
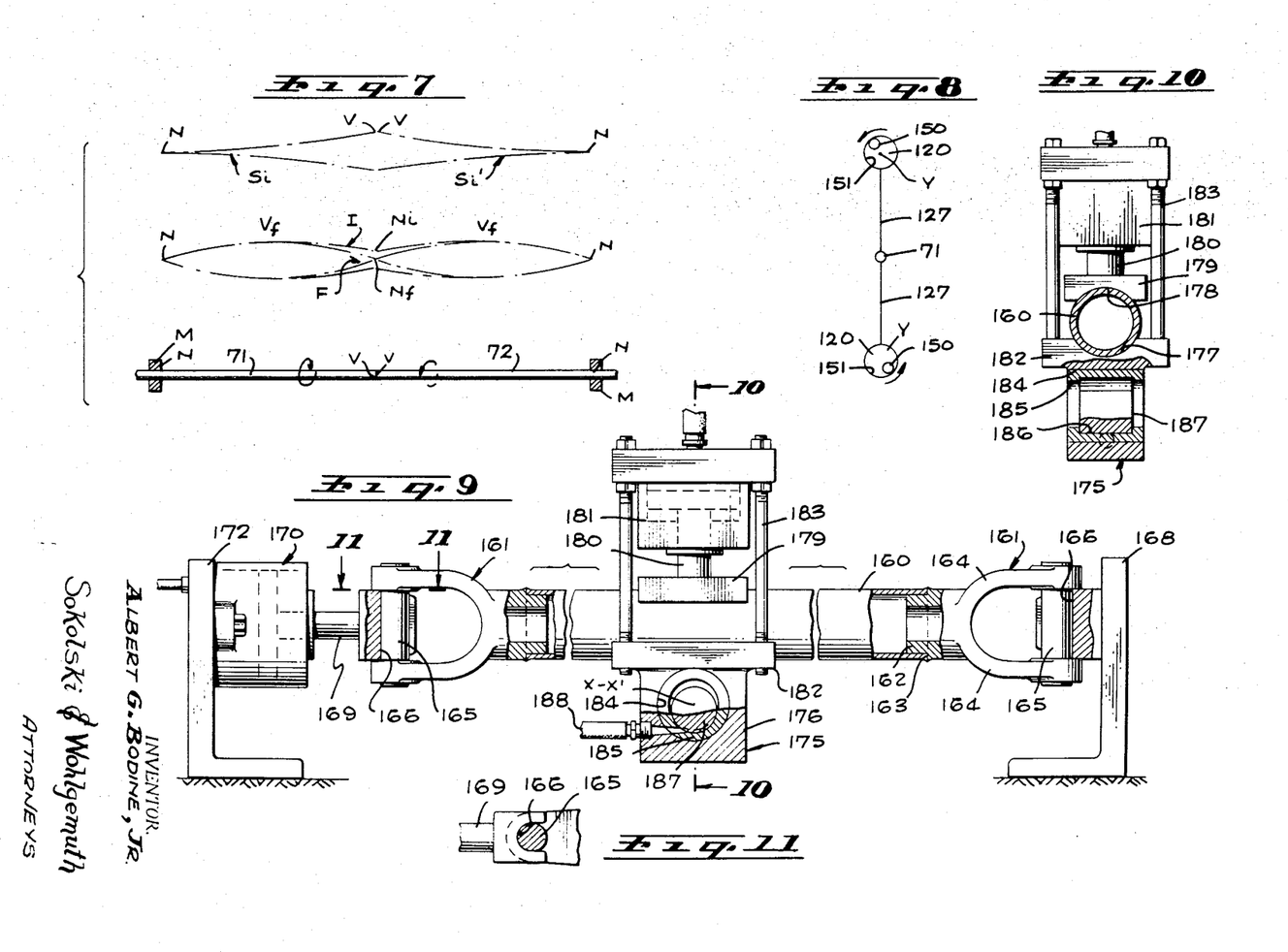
FIG. 7 is a diagrammatic view showing the pipes being welded in the apparatus of FIGS. 2—6 and showing certain standing wave diagrams demonstrating the operation of the machine.
FIG. 8 is a diagrammatic view illustrative of the phasing of a pair of vibration generators as used in the system of FIGS. 2-—6.
FIG. 9 is a side elevational view, with parts broken away in medial section, showing an illustrative application of the invention to the welding of a pair of universal joints to opposite ends of a tubular shaft.
FIG. 10 is a transverse section taken on line 10-10 of FIG. 9.
FIG. 11 is a detail section taken on line 11-11 of FIG. 9.

Rotatably mounted on the pipe 77 between collars 76 is a housing assembly 86 for an electric motor 87, to the shaft of which is coupled a milling cutter 88 adapted for engagement with the ends of both of pipes 71 and 72 when the pipe 71 has its extremity substantially in the position indicated in dot-dash lines 71a in FIG. 2. The housing assembly 86 has fixed thereto a spur gear 90 surrounding and rotatable on the pipe 77, and meshing with this spur gear is a spur gear 91 on a shaft 92 journaled in the lower end portion of a bracket arm 93 projecting from hanger 74. On spur gear shaft 92 is fastened an operating lever 95. When the milling cutter 88 has completed its operation of finishing off the ends of pipes 71 and 72 (the pipe 71 being in position 71a, FIG. 2), the lever 95 may be swung to rotate the housing assembly 86, through gears 91 and 90, so as to swing the milling cutter 88 to a position of clearance relative to the pipes 71 and 72 (FIG. 3). The two pipe clamp means 81 and 83 are similar, and will next be described. The lower portion of the suspension means 80 or 82, as the case may be, comprises a thick and massive plate member 100, affording the acoustic circuit mass element M (FIG. 7). Plate 100 has a transverse tapered bore 101 receiving, with clearance, the corresponding pipe member, as shown. A pair of arcuate wedge slips 102 are receivable in the tapered bore 101 on opposite sides of the pipe, and when forced inwardly axially of the pipe, are wedged radially inwardly to clamp the pipe tightly therebetween. The wedge slips 102 are so forced inwardly by hydraulic pressure exerted against pistons 104 connected to the slips by links 105 and working in cylinders 106 mounted in the plate 100, all as clearly shown in FIG. 2. Hydraulic fluid is introduced into the cylinders 106 underneath the pistons to effect clamping action by fluid introduced under pressure via passageways 107, and may be exhausted from the spaced above the pistons via passageways 108.

As will be evident, the hanger plate members 100, which may thus be very tightly clamped to the pipes 71 and 72, are relatively massive, and thus, from the acoustic standpoint, mass-load the pipes at the clamping points. An inductive or inertial mass reactance is thus added to the pipe at a predetermined distance from the free extremity thereof, and thereby, as will be described in more particular hereinafter, a nodal point for the sonic standing wave set up in the pipe is established at the clamping point.

A pipe alignment jig, generally designated at 110, is suspended by a link 111 from the arms 76 of the yoke 74 on the side of the fixed suspension means 80, as illustrated, and this jig provides alignment guide bushings surrounding the pipes 71 and 72 closely adjacent the opposed extremities of the latter, and affords mountings for components as presently to be described. The bushings 112 preferably comprise suitable plastic rings 113, composed of a suitable material such as a fiber-filled molded phenolic resin. The plastic rings 113 may be molded inside cylindric casings 114. The latter are tightly received inside the hub portions 116 of jig frames 117, in which are tightly mounted, outside of and on opposite sides of the alignment bushing 112, a pair of electric drive motors 118, which may be induction motors, or preferably, in many cases, series-wound DC motors having a substantial inverse speed-responsive characteristic to load. The motors 118 have drive shafts which are parallel with the pipes 71 and 72 and which drive orbital-mass-type vibration generators or oscillators 120 of the general character heretofore described. These generators 120 may be, for example, of the type shown in FIG. 1 of my U.S. Pat. No. 3,217,551, to which reference may be had for a thorough understanding. Suffice it to say that the generators 120, when driven by the motors 118, produce rotating force vectors turning about the axes of the motor shafts, and exerted by the housing of the generator on the structure that is supporting this housing. In this case, the housing of each vibration generator 120 is tightly received in the outer portion of a transverse frame 123, which has a central base portion 124 formed with a tapered bore 125 which surrounds, with clearance, the pipe 71 or 72, as the case may be, and which is clamped tightly to the pipe by wedge slips 126 inserted inside the tapered bore 125 and forced tightly against the pipe by tightly setting up holding screws threaded through the wedge slips and into the hubs 124. The frame affords, in effect, two radially oppositely extending torque arms 127 clamped to the pipe. Thus, the rotating force vector generated by each oscillator 120 is exerted on the free end of the corresponding torque arm, and is applied by said arm as an oscillatory torque on the portion of the pipe 71 or 72 clamped by that torque arm.

It is to be noted that each of pipes 71 and 72 thus has clamped thereto, near its free end, through a pair of torque arms, a pair of orbital-mass vibration generators. These are phased to coact torsionally in an additive sense, as will be described more fully hereinafter. As one optional means for phasing the two pairs of vibration generators on opposite sides of the joint between the two pipes, I here show the motor shafts 130 and 131 to be provided with a slip coupling 132, which may be of any suitable type—'or example, a splined shaft in a splined coupling sleeve, as here represented. The reason for this phasing will be referred to more particularly in the ensuing discussion of operation.

To complete the description of the jig 110, the two jig frames 117 are suitably interconnected with one another, as here shown. By being formed at the bottom with sleeves 136, one of which tightly receives a connecting shaft 137, and the other of which slidably receives said shaft. The frames 117 may thus move toward one another when the pipe ends are moved together. The shaft 137 is shown to project from the outer extremities of the sleeve members 136, and to pass with clearance through apertures 138 formed at the bottom of the oscillator support frames 123. In the operation of the device, the frames 123 oscillate torsionally through a small angle, and the apertures 138 accommodate such torsional deflection. At the same time, the projection of the shaft 137 through the apertures 138 in the oscillator frame 123 assures or facilitates rough alignment of the parts.

Operation is as follows: The machine is assembled first with the pipe 72, being positioned and clamped thereon as illustrated in FIG. 2. The new pipe length 71 to be added is then brought up, run through the clamp means 83, vibration generator frame 123, the alignment bushing 112, and on up to a position such as illustrated at 71a in FIG. 2. It is then clamped both by clamp means 83, and the torque arm wedge slips 126. At this time, the opposed end portions of the two pipes 71 and 72 will normally be somewhat in the path of the motor-driven milling cutter 88 as the latter is swung in a plane transversely of the pipes by operation of lever 95. Thus the ends of the pipe are provided with nicely squared end surfaces which, because of the alignment of the pipes assured by the guide bushings mounted on the jig, will come into good aligned abutment and full-face engagement with one another when milling cutter 88 has subsequently been swung aside and the pipe 71 advanced toward the right. It will of course be understood that the drive motor 87 drives the milling cutter 88, and that the swinging action of the milling cutter while rotation takes place is accomplished by swinging of the aforementioned lever 95. When the pipe and finishing operation has been completed, the milling cutter is swung out of the way by means of handle 95, as to the position of FIG. 3, and the pipe 71 then moved to the right to engage the pipe 72, as shown in FIG. 2. This movement may be accomplished by the hydraulic jack indicated generally at 139, pivotally connected at one end to the suspension means 82, as indicated at 140, and linked at the other end to an ear 141 formed on the adjacent arm of the yoke 74. The internal details of the hydraulic jack 139 need not be shown, since hydraulic jacks are well known. However, as will be understood, admission of pressure fluid to the chamber of this jack will be understood to actuate a plunger therein so as to slide the suspension means toward the right on the pipe member 77 until the pipe 71 abuts the pipe 72. This hydraulic jack 139 can also be used to maintain a light pressural contact of the two pipe ends against one another.

The torsional vibratory action induced in the pipes 71 and 72, and the manner of producing this vibratory action by the vibration generators described hereinabove, will now be explained. Consider first the left-hand pipe member 71. This pipe member is tightly clamped at a certain distance back from its free end by the relatively massive clamping means 83. This point of the pipe, therefore, is substantially rigidly held, both by virtue of the clamping action, and by virtue also of the inertia or mass M of the relatively heavy clamping means applied thereto. Accordingly, the oscillatory torque exerted on the pipe 71, applied to the pipe near the milled-off, free extremity thereof, causes this portion of the pipe to elastically twist in first one direction and then the other, with the amount of the twist progressively decreasing from the point of application of the oscillator torque to the point rigidly held by the clamp means 83 and made steady by the mass M. By properly relating the length of the pipe between the clamp means 83 and the free end of the pipe to the frequency of torsional oscillation, a quarter-wavelength, resonant standing wave pattern of a torsional mode can be set up in that portion of the pipe, there being a node N of this standing wave at the clamp means and mass M, and an antinode V of the standing wave at the free extremity of the pipe. Those skilled in the acoustics art are familiar with this relationship. Similar torsional resonant standing wave vibration or oscillation is set up in the pipe 72, and reference is made to FIG. 7 for a diagrammatic representation of these actions. At Si is represented a quarter-wavelength torsional standing wave for the pipe 71 from the node to the antinode, and similarly at Si' is represented the corresponding standing wave for the pipe 72. It is further a preferred feature of the invention that when the pipe 71 is twisting in one direction, the pipe 72 is twisting in the opposite direction, the purpose being to have maximized relative motion between the ends of the pipe, so that these will work frictionally on one another to a maximized extend and thus readily accomplish a fusion weld. It is of course not strictly necessary that the two pipes 71 and 72 oscillate precisely 180° out of phase, though this is preferred as it affords a maximum frictional action. However, the process can be carried out just so that there is some frictional rubbing of one pipe end on the other as the two pipes undergo their torsional oscillation. Referring further to FIG. 7, it will of course be understood that the standing wave diagrams Si and Si' represent the amplitude of torsional elastic deflection in each of the pipes 71 and 72 between the nodes N and the antinodes V at different points along the pipe, the amplitudes, as shown, being maximized at the free extremities of the pipes.

Synchronization and phasing of the various generators is preferably obtained in the following manner. Reference is directed to diagrammatic FIG. 8, showing the pipe 71, the two torsion arms 127 and the two vibration generators 120 mounted on the two torsion arms. Each vibration generator involves an inertia mass rotor 150 rolling around a raceway 151 in an orbital path, so as to apply to the raceway 151 and thus to the external housing of the vibration generator a rotating force vector turning about the central axis Y of the raceway. It will now be observed that if the orbital rotors 150 are phased at 180° opposition to one another, as represented to be in FIG. 7, the components of radially directed force in line with the torque arms 127 will always be equal and opposed and therefore cancel within the structure of the torque arms 127 and the intervening pipe 71. Also, the components of force at right angles to the arms 127 will always be equal and opposed, and thus will all cancel. However, these latter forces exert force couples, i.e. torsional deflecting forces, on the pipe, and it will be seen that these are first in one direction and then the other as the rotors go around the two opposite sides of the raceways. In summary, I thus apply to an end portion of each of the two pipes 71 and 72 an alternating force couple, such as elastically twists the two end portions of the two pipes alternately in reverse directions.

The aforementioned synchronization or phasing of the two orbital-mass rotors 150 of each pair of oscillation generators on the same side of the pipe joint may be accomplished in various ways, such as by gearing together the two vibration generators, or by phasing properly the two driving motors 118. Even without any such phasing, however, the two orbital-mass rotors are found to self-synchronize themselves entirely automatically when acting as component parts of a resonant vibratory system. This system was described in my aforementioned U.S. Pat. No. 3,217,551. The synchronization or phasing of the two orbital-mass rotors 150 of each pair of generators 120 is thus simply accomplished in any of various ways.

As pointed out hereinabove, it is also preferable that the pairs of generators 120 clamped to the two pipes 71 and 72 on opposite sides of the pipe joint operate in phase opposition, so as to assure opposite directions of oscillatory twisting of the two pipe ends on one another. To this end, and for simple illustration, the shafts of the two lower motors 118 have been coupled together by a coupling 132, and if the backs of the motors on the opposite sides of the pipe joint to be made should of course have opposite normal directions of rotation. Of course, if the four motors all face in the same direction, they can all have the same normal direction of rotation. Assuming such an arrangement to have been made, the vibration generators directly driven by the two lower motors can then be preliminarily phased in 180° opposition, and each of these lower motors can be arranged for provisions for phasing properly with the motor above it, or will automatically phase with the motor above it, in the manner heretofore described.

However, these phasing arrangements are carried out, the result is that the two ends of the two pipes 71 and 72 oscillate torsionally in light contact with one another. To accomplish proper performance in accordance with the invention, each pipe end is at the velocity antinode of a torsional elastic resonant oscillation of a quarter-wavelength of the pipe, and this is accomplished by providing a proper length of pipe from the clamp means and mass $M$ to the free extremity of the pipe such that a resonant, quarter-wavelength standing wave performance, in a torsional mode, takes place in that length of pipe at the frequency established by the drive motors 118. Under these circumstances, a large amplitude of torsional vibration takes place at the two extremities of the two pipes, and thus the two pipes are frictionally rubbed on one another at substantial amplitude under a resonant performance. Of course, as in earlier described forms of the invention and in the introductory portion of this specification, it is to be understood that the motors 118 are actually given a normal performance characteristic such as to drive normally at a speed or frequency which drives the vibration generators just under the frequency for the peak of resonance; and, as also described hereinabove, the drives are preferably of a slip type and with such characteristics as to be inversely speed responsive to load. The system then operates with frequency stability, and with capability for accommodating to changes in the impedance of the load, which in this case is the pair of pipe extremities vibrating torsionally against one another.

At the outset, the load will be seen to have a large energy dissipative factor or resistance. As the fusion-welding process goes forward, this resistance is modified, and reactances are introduced, with consequent change in the impedance of the load. Reference is again directed to FIG. 7, showing at the top the two standing wave performances of the two pipes 71 and 72 prior to softening of the metal by the heat of friction and thus prior to the beginning of fusion. As the two pipe ends heat up, they begin to soften and to fuse to one another.

Initially, frictional resistance between the pipe ends oscillating against one another is high, meaning, of course, a high power factor for the orbital-mass vibration generators. This resistance factor may or may not increase as temperature first increases; but when the metal softens and begins to fuse, the frictional factor decreases, and each shaft experiences the effect of reactance from the other to which it is then partially joined, so that there is a change in impedance. The phase angle thus begins to increase and the power factor to decrease. The motor-driven orbital-mass vibration generator adjusts to these changes in load, as explained heretofore, thus maintaining good impedance adjustment to the load. As the shaft ends progressively undergo fusion to one another, the wave pattern shifts from those of $Si$ and $Si'$ through that represented at I, where the vibration amplitude is decreased, producing at the joint a sort of pseudonode $Ni$ where the antinodes were once located to the final pattern at F, where there may be substantially or nearly a node $Ni$ at the joint. There is then an antinode at $Vf$, and it will be seen that the wavelength of the pattern has then approached half of what it was initially, while the frequency of the wave approaches double its initial frequency. In other words, there is now a resonant frequency at double that at the beginning of operation; and the motor-driven vibration generators automatically follow this increase in resonance frequency. They do this because, as resonance frequency increases incrementally, there is a momentary increment of decreased load on the drive motors at the original frequency. The drive motors respond instantly with increased speed. Also, the motors are again made insufficiently powerful to drive the system up to and over the peak of resonance, and the system tends to stabilize just below peak resonance, as before. The system again therefore accommodates for changes in impedance, and accommodates also for changes in resonance frequency as the parts are joined.

Reference is next directed to FIGS. 9—11, showing an additional application of the invention wherein a lateral mode of vibration is utilized to form a fusion weld between the ends of a tubular shaft and a pair of universal joints.

A tubular shaft is designated generally by the reference numeral 160, and to the two ends of this shaft are to be fusion welded two universal joints 161. As here shown, the butt end or root of each of these universal joints includes a tubular member 162 receivable with a free fit inside the end portion of the shaft 160, and formed with a shoulder 163 adapted to abut the end of the shaft 160. The weld is to be made on the facing and abutting surfaces on the end of the pipe 160 and the shoulder 163.

The universal joint 161 is completed by two arms 164 supporting a universal joint pin 165, and in the apparatus here shown, the universal joint at one end is supported by an arcuate seat 166 engaging the pin 165 and projecting from a suitable fixed support generally represented by the numeral 168. At the other end, the pin 165 is engaged by a seat 166 which is on a plunger shaft 169 projecting from a hydraulic jack 170 on a suitable fixed support 172. It will be understood that the plunger shaft 169 has inside cylinder 170 a plunger head working in a cylindrical chamber, and that suitable hydraulic lines are provided, together with suitable controls, whereby the plunger 169 may be extended or retracted to engage and support a universal joint assembly such as described, or release it when the work has been finished.

Figure 12:
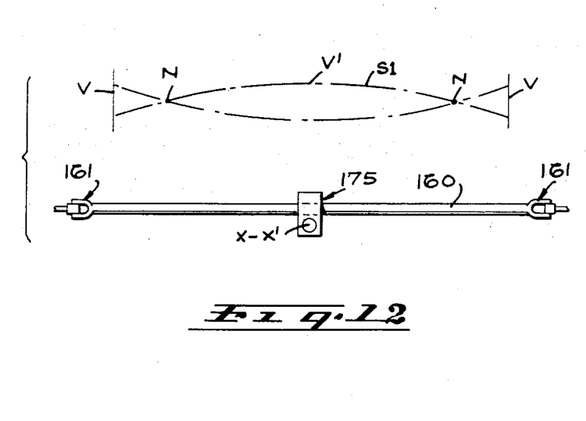
FIG. 12 is a diagrammatic view of the apparatus of FIG. 9 showing also a standing wave as set up in the hollow shaft in the operation of the system.

The present application of the invention involves the use of a lateral mode of resonant elastic vibratory action in the hollow shaft 160, with a wave pattern such as represented in the diagram of FIG. 12. To accomplish the wave pattern as represented, I mount on the central region of the shaft 160 an orbital-mass vibration generator of the type heretofore described, and as indicated in the drawings by the reference character 175. The generator 175 delivers to its exterior housing 176 a rotating force vector, turning about an axis $X-X'$. The housing 176 will be seen from FIG. 10 to have an arcuate seat 177 which engages the lower side of the shaft 160, while the upper side of said shaft, just above seat 177, is engaged by an arcuate seat 178 on a pad or head 179 on the lower end of a plunger 180 extending from a hydraulic jack 181. The hydraulic jack 181 and the body plate 182 in which the aforementioned seat 177 is formed, are connected by tie rods 183, and thus extension of plunger 180 and clamping head 179 under hydraulic jack 181 affords a tight-clamping engagement of the generator 175 to the center portion of the shaft 160.

In the simple form here shown, the generator housing 176 has, concentrically located with the transverse axis $X-X'$, a bore 184 containing a raceway cylinder 185, the latter having formed therein a recessed, cylindrically formed raceway surface 186 for an inertia roller 187. The latter is driven to run around the raceway surface 186 by means of air under pressure supplied via an airhose 188 and leading to a jet or nozzle passageway in the body 176 and the raceway member 185 to open tangentially inside the raceway surface 186. Air under pressure delivered from this tangential nozzle drives the rotor 187 to spin about the raceway surface 186. This will be seen to be a slip-drive type of vibration generator as referred to hereinabove. The cylindrical rotor 187 rolling around the inside of the raceway surface 186 generates within the raceway member 185, and thus within the housing 176 holding the latter, a radial force vector turning about the axis $X-X'$, as previously mentioned.

It is to be understood that the pressure and volume of air delivered via the hose 188 must be such as to drive the generator rotor 185 at a frequency approximating, but preferably on the low side of, the resonant frequency for a mode of lateral standing wave vibration, preferably the full-wavelength mode as diagrammed at $Si$ in FIG. 17. Under these conditions, as represented in this diagram, there is a velocity antinode V, or region of maximized vibration amplitude, at each end of the shaft, as well as a velocity antinode V' at the center, while there are nodes N, or regions of minimized vibration amplitude, at points approximately 20 percent of the length of the shaft 160 will be seen to take place, because of resonance in the lateral node, in planes transversely of the shaft, but it will be evident that the vibration generator 175 will also deliver to the pipe 160 a component of alternating force disposed longitudinally of the pipe. By driving the generator at the frequency for resonance in the lateral mode, or preferably, as heretofore explained, just below the frequency for lateral resonance at peak amplitude, the normal blocking impedance for vibration in the transverse mode is greatly reduced, so that large amplitudes of vibration may be experienced at the antinodes in transverse planes (in this case, vertically). On the other hand, the components of vibratory force exerted by the generator 175 in directions longitudinal of the shaft 160 are not near to any longitudinal resonant frequency of the shaft, and therefore longitudinal components of vibration in the shaft 160 are of small magnitude and can be neglected.

Thus, in the operation of the system, the two opposite end portions of the shaft 160 are vibrated in transverse planes, i.e. in the plane of the two end surfaces of the shaft, at a resonant frequency of the shaft for the transverse resonant standing wave mode employed. The two ends of the pipe thus vibrate transversely against the universal joint shoulders 163. It will be evident, of course, that the vibratory amplitudes of the end portions of the shaft 160 are relatively small. They are, however, very powerful. The universal joint, on the other hand, is not tightly enough joined to the shaft 160, prior to welding, that it will be caused by frictional forces to follow the vibratory action of the shaft. Accordingly, the type of sonic vibratory action, at a resonant frequency of the system, causes relative vibration of the parts, and therefore frictional heating, until the metal melts and fuses. In this performance, changes of impedance take place, analogous to those described in earlier embodiments of the invention, and in the introductory portion of the specification, and the orbital-mass vibration generator 175 automatically accommodates for these changes, all as heretofore described.

Figure 13:
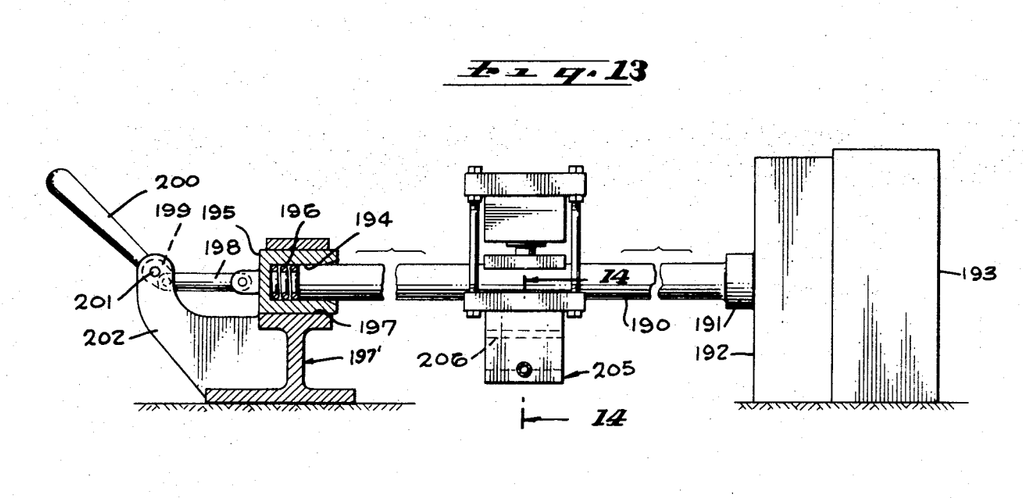
FIG. 13 is a side elevational view, with parts in vertical medial section, showing an application of the invention to the fusion welding of a pin or shaft to a surface area on a large body.
Figure 14:
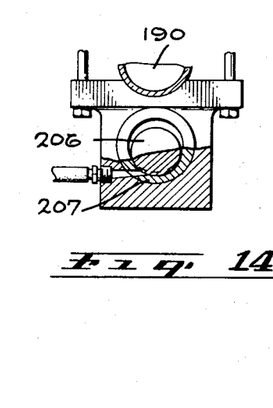
FIG. 14 is a detail section taken on line 14-14 of FIG. 13.

Reference is next directed to FIGS. 13 and 14, showing a final application of the invention, in this case to the fusion welding of a shaft or pin to a surface of a body, in this case using a gyratory and/or torsional type of resonant elastic standing wave vibration in the shaft.

The shaft, which must be of an elastic material, such as steel, or a resin, is designated generally at 190, and as here shown, has an enlarged head 191 on one end thereof. This head 191 is shown to abut against a surface of a body 192, positioned by an abutment 193 secured to the work table, as illustrated. The other end of the shaft 190 is received, with clearance, in a socket 194 formed in cup 195, and engaged by a coil compression spring 196 in the bottom of said cup. The cup 195 is slidable in a bore 197 in a support 197', and is connected via a link 198 with the short arm 199 of a clamp lever 200 pivotally mounted at 201 on a mounting bracket 202. The lever arm 199 and the link 198 form a toggle, enabling the parts to be positioned by handle 200 so that the left-hand extremity of the shaft 190 is under spring pressure from the spring 196 during operation, whereby the head 191 on the opposite end of the shaft 190 is lightly pressed against the body 192 to which it is to be welded.

In this application of the invention, a gyratory (or torsional) type of resonant standing wave is set up on the pipe 190, and for this purpose, a vibration generator 205 is clamped to a center region of the shaft 190. The generator 205 may be the same as the generator 175 of the embodiment of FIGS. 9—11, but with the exception that the axis of the race ring for the orbital-mass rotor, here designated at 206, and its cylindrical raceway 207, have been turned through 90°, so that the axes thereof are parallel with the shaft 190. The orbital-mass rotor 208 acts to generate and apply to the generator housing, and thence to the shaft to which the generator housing is clamped, a rotating force vector, which rotates about a longitudinal axis near and parallel to the shaft. The elastic shaft is thereby set into a bodily gyratory type of motion, which actually amounts to two rectilinear vibrations on axes at right angles to one another and occurring with 90° phase difference therebetween. This motion is propagated along the length of the shaft, reflected from the ends thereof, and when the generator frequency is correct for resonance, a gyratory type of one-wavelength resonant standing wave vibration takes place in the shaft. This type of performance was fully described in my aforementioned prior U.S. Pat. No. 2,960,314, FIGS. 1—4, and the portion of the specification pertaining thereto. In this type of gyratory action, the end surface of the shaft 190, or in this case, of the enlarged head thereon, gyrates bodily at the resonance frequency in contact with the surface of the body 192, and thus friction is set up sufficiently to heat and melt the metal in the region of the two engaging surfaces, such that these surfaces fuse to one another.

As in the applications of the invention discussed hereinabove, the orbital-mass vibration generator slip driven by pressurized fluid, again presents the advantages of frequency stabilization, accommodation to changes of impedance, in either or both of the resistive and reactive components thereof, during changing conditions of the work process, automatic adjustment always to required phase angle and power factor, as well as to any changes in the frequency for resonance, all as discussed hereinbefore.

It will be understood that the acoustic circuit of the invention, diagrammed in FIG. 1, is present in all of the disclosed illustrative applications of the invention. It should also be evident that this acoustic circuit has a breadth of application going beyond that of fusion welding, and extending to any process wherein impedance and frequency changes may be encountered during a work process and where maximum performance demands automatic accommodation to these changing factors.

I claim:

1. An acoustic circuit system comprising:
an orbital-mass vibration generator having an output;
an elastically vibratory resonator acoustically coupled to said output of said generator;
a vibratory sonic-energy-consuming means acoustically coupled to said output of said vibration generator, and having the characteristic of changing impedance with consumption of acoustic energy; and
a slip-drive means for normally driving said generator at an operating frequency near to but under that for peak resonance in the discrete vibratory circuit system comprised of said generator, said resonator and said vibratory sonic-energy-consuming means.

2. The subject matter of claim 1, wherein said vibratory system has the characteristic of changing resonance frequency with progressive consumption of sonic energy by said vibratory sonic-energy-consuming means, and said orbital-mass generator and slip-drive means are automatically responsive by change in phase angle, power factor and operating frequency to accommodate said changing impedance and to maintain the operating frequency near to but under that for peak resonance in said discrete vibratory circuit.

3. The subject matter of claim 1, wherein said slip-drive means comprises a motor means having the characteristic of inverse speed responsiveness to load.

4. The subject matter of claim 1, wherein said vibratory, sonic-energy-consuming means embodies members in frictional contact and vibratory relative to and against one another.

5. The subject matter of claim 1, wherein said vibratory, sonic-energy-consuming means embodies a member vibratory relative to and against another member and which becomes progressively welded to said last-mentioned member, whereby the reactive impedance of said vibratory circuit system is progressively changed.

6. The subject matter of claim 1, wherein said resonator is acoustically intercoupled between said generator and said vibratory sonic-energy-consuming means and functions as a sonic energy transmission means therebetween.